Feb. 3, 1970     A. Z. LIPSKI     3,493,739
TAILLIGHT FOR A BICYCLE
Filed April 5, 1967
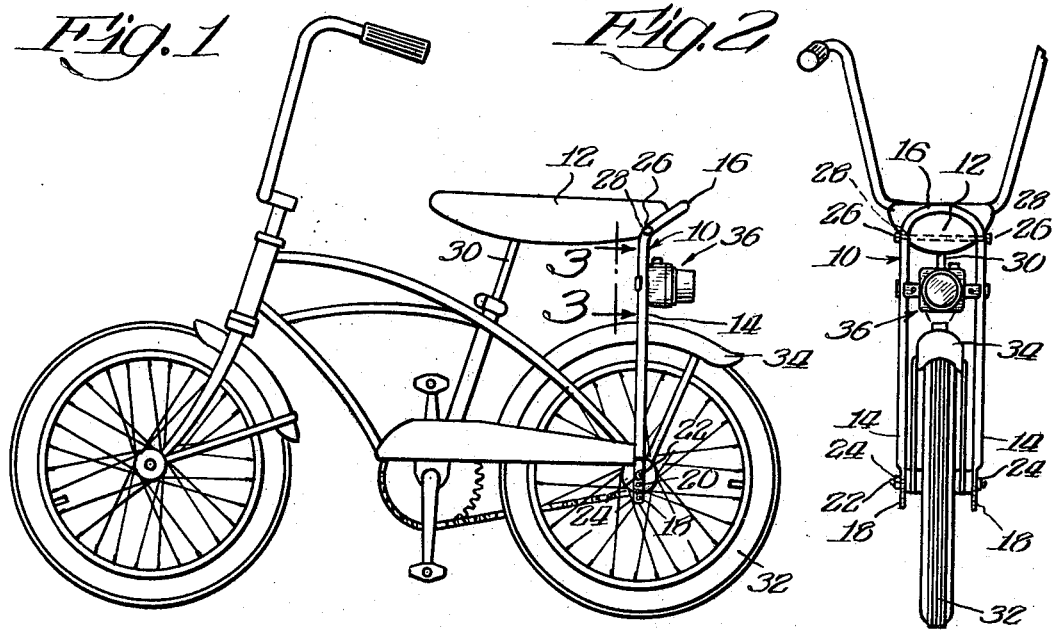
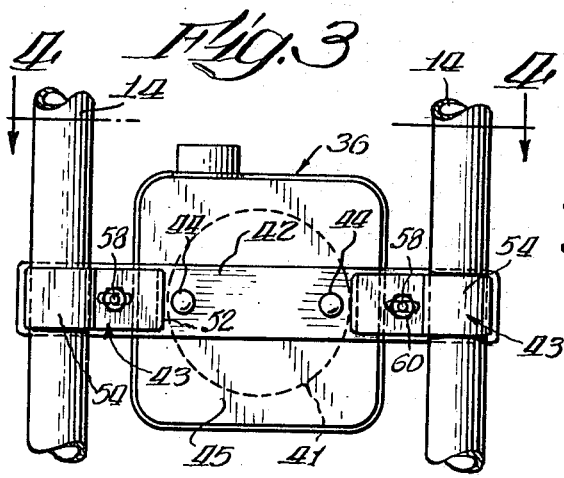
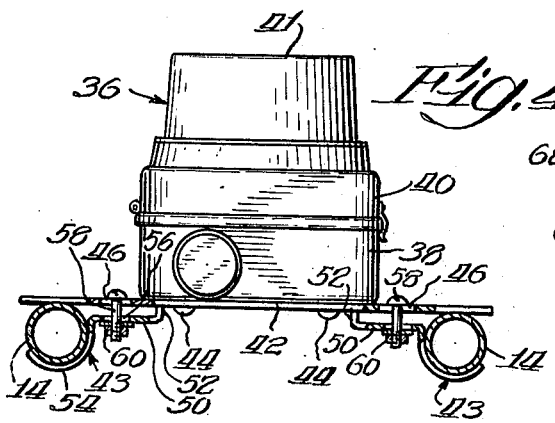
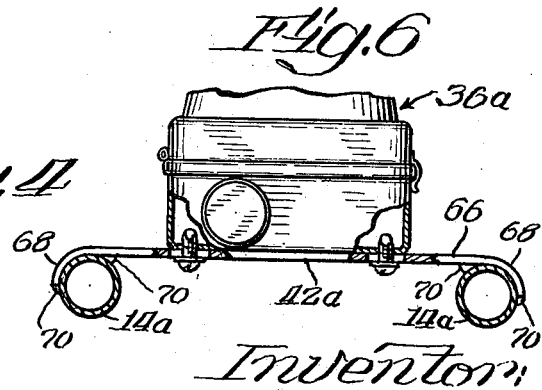
Inventor:
Arthur Z. Lipski
BY Max R. Kraus ATTY

United States Patent Office 3,493,739
Patented Feb. 3, 1970

3,493,739
TAILLIGHT FOR A BICYCLE
Arthur Z. Lipski, Highland Park, Ill.
(1643 Sheridan Road, North Chicago, Ill. 60064)
Filed Apr. 5, 1967, Ser. No. 628,588
Int. Cl. B62j 5/00; B60q 1/30
U.S. Cl. 240—7.55                4 Claims

ABSTRACT OF THE DISCLOSURE

A taillight for a bicycle is mounted on a pair of spaced side members positioned in a generally upright position to support the rear of a saddle seat above the rear wheel of the bicycle. A mounting strip is secured to the taillight and extends between the side members to support the taillight facing rearwardly. Clamping members secure the mounting strip to the spaced side members.

BRIEF SUMMARY OF THE INVENTION

The invention comprises the mounting of a battery operated taillight on the mounting bar which supports the rear of the seat of the bicycle so that the taillight is mounted below the seat and above the fender or guard of the rear wheel of the bicycle.

BACKGROUND OF THE INVENTION AND OBJECTS

The saddle type of seat for use in connection with bicycles has become very popular. Due to the nature of this type of seat it must be supported at the rear thereof by a mounting bar, the lower end of which is generally attached to the rear axle of the bicycle. The object of this invention is to provide a taillight mounted on a mounting bar above or below the seat and above the rear wheel guard so that the taillight is at a height which is best visible to the driver of the vehicle following the bicycle. Prior bicycle taillights have been mounted at a level too low to be readily seen by the driver, consequently, many accidents have occurred. This condition will be avoided by the utilization of this invention. The seat mounting bar provides an excellent support on which a taillight may be attached, with a minimum of expense, and provides the height for the taillight to be readily visible to the drivers of vehicles following, thereby providing a very important safety factor which would reduce accidents normally occurring.

Other objects will become apparent as this description progresses.

BRIEF DESCRIPTION OF THE DRAWINGS

In the drawings:

FIGURE 1 is a side elevational view of a bicycle with the preferred form of the invention attached thereto.

FIGURE 2 is a rear view of the bicycle with the invention attached.

FIGURE 3 is an enlarged view taken on line 3—3 of FIGURE 1.

FIGURE 4 is a view partly in section taken on line 4—4 of FIGURE 3.

FIGURE 5 is a view of a modified structure taken on lines corresponding to that of FIGURE 4, and FIGURE 6 is a view of a further modification taken on lines corresponding to that of FIGURE 4.

DESCRIPTION OF THE EMBODIMENTS

The bicycle, best shown in FIGURES 1 and 2, is conventional and has the conventional mounting bar generally indicated at 10 for supporting the rear of a saddle type seat 12 of a bicycle. The mounting bar 10 is formed of a metal tubular member which is bent to the shape best shown in FIGURES 1 and 2 and comprises a pair of spaced tubular side members 14 connected by a curved or arcuate shaped portion 16 which forms the top of the mounting bar. The arcuate shaped top portion 16 is inclined rearwardly at an obtuse angle with respect to the vertically or upright extending side members 14. The lower portions of the spaced side members 14 are flattened as at 18 and are each provided with a plurality of spaced alined openings 20.

The mounting bar 10 is secured to the rear axle 22 of the bicycle wheel with the axle passing through a pair of aligned openings 20 of the mounting bar. The mounting bar is secured to the axle by suitable nuts 24 secured to the opposite ends of the axle. The plurality of openings 20 permit the raising and lowering of the mounting bar relative to the axle for the purpose of adjusting the height of the seat. The conventional saddle seat 12 is secured at its rear by suitable fastening means 26 which extend through alined openings 28 at the upper end of the vertical sides 14 to thereby support the rear end of the saddle seat. The forward portion of the saddle seat is supported by an inclined bar indicated by the numeral 30. The bicycle has the usual rear wheel 32 also supported on the axle 22 and the wheel guard 34. All of this construction is conventional and no invention is claimed therein.

The inventive feature is the mounting of a battery operated taillight on the vertically supported side members 14 of the mounting bar 10. FIGURES 1 to 4 inclusive show the bicycle taillight with mounting means which would permit attachment by the use of clamping means without defacement of the mounting bar 10 and without requiring the use of any tools other than a conventional screwdriver. It also permits adjustment as to height. This construction could be used for installation at the factory or as an accessory to be purchased and installed subsequently. It permits taillights to be presently installed on bicycles now in use.

The construction shown in FIGURES 1 to 4 inclusive comprises a taillight generally designated by the numeral 36 which is of conventional construction and comprises a housing 38 provided with a hinged cover 40 secured thereto. The hinged cover 40 has an enlarged central opening which is occupied by a red lens or reflector 41 to close the opening. The taillight has the usual socket and small bulb, as well as small dry cell batteries for supplying the current to the taillight bulb. The taillight also has a manually operated switch for opening and closing the circuit. The taillight, therefore, is a self-contained unit which is illuminated when the switch is closed.

As best shown in FIGURES 3 and 4, there is provided a mounting member consisting of a metal strip 42 and a clamping bracket 43. The metal strip 42 is suitably attached as by rivets 44 or other fastening means to the rear wall 45 of the taillight housing 38. The strip 42 extends transversely of the housing and beyond the sides of the taillight and is of a length to span the distance between the side members 14 of the mounting bar and engage the front of the spaced side members 14. The strip is provided with a pair of spaced elongated slots 46, one on each side adjacent the opposite ends of the strip. The clamping bracket generally designated by the numeral 43 is secured to said strip 42 at each of the opposite ends of the strip and the bracket 43 is adapted to engage both the strip 42 and the side 14 of the mounting bar. The clamping bracket 43 is made of metal and comprises a wall portion 50 which terminates in an inwardly turned inner end 52. The opposite or outer end of the bracket 43 is curved to form an arcuate shaped outer portion 54 which is shaped complementary to the rear portion of the side members 14 for engagement therewith. The wall 50 of the clamping bracket has an elongated slot 56 which aligns with the slot 46 in the strip. The clamping bracket is secured to the front strip 42 by means of a threaded bolt 58 which passes through the aligned slots in the strip and in the bracket and is held in position by means of a nut 60.

By virtue of the mounting member shown, the taillight may be readily attached to or detached from the side members 14 of the mounting bar and same may be slid thereon to any desired height and held in its adjusted position by tightening the nuts 60 which pulls the strip and the clamping bracket towards each other and tightens same with respect to the side members 14 of the mounting bar to hold the taillight in a fixed position. By loosening the nut, free play is provided between the front strip 42 and the rear clamping bracket 43 and the taillight may be slid up or down relative to the side members 14 to the desired elevation. The taillight is positioned below the seat and above the rear wheel guard or the rear wheel. This permits the taillight to be positioned at the proper height whereby it may be readily seen by motorists following the bicycle and who might not see a taillight positioned below the top of the rear wheel.

The means for mounting as shown are very simple and the taillight may be readily secured to the side members of the mounting bar in a matter of a few minutes without the use of any tools other than a screwdriver.

The modification shown in FIGURE 5 is that used where the taillight is installed preferably at the source of manufacture and as shown the side members 14' of the mounting bar 10 are each drilled to provide an opening 62. The strip 42' is secured to the rear wall of the taillight 36' by rivets or the like as previously described. The strip 42' is provided with an opening or slot 46' adjacent each of its opposite ends which is in alignment with its respective opening 62 in the side members 14'. The strip 42' is secured to the side members 14' by screwing a threaded fastening member 64 into the opening 62, or a threaded member may pass through the opposite sides of the side members of the mounting bar and held by means of a nut.

In the modification shown in FIGURE 6, the strip 66 which is secured to the taillight housing has its opposite ends curved or bent as at 68 to curve around a portion of the side members 14a of the mounting bar and the strip is brazed or otherwise permanently fastened as at 70 to the side members of the mounting bar.

It will be understood that various changes and modifications may be made from the foregoing without departing from the spirit and scope of the appended claims.

I claim:
1. In a bicycle provided with a mounting bar for supporting the rear of a saddle seat, with said mounting bar having a pair of spaced side members positioned in a generally upright position, wherein the improvement comprises a taillight, a mounitng member comprising a strip secured to said taillight, said mounting member being of a length to extend between the spaced side members and engage said side members, and a clamping member adapted to engage the spaced side members, said mounting member and clamping member each having an opening to receive a fastening member to hold same together relative to the spaced side members to support said taillight below the seat and above the rear bicycle wheel, said clamping member being adjustable with respect to said strip to tighten or loosen said mounting member relative to said side members of the mounting bar.

2. A structure as defined in claim 1 in which the strip engages the front of the side members and the clamping member engages the rear of the side members and in which either the strip or the clamping member has an arcuate-shaped outer portion engaging the spaced side members.

3. A structure as defined in claim 1 in which the strip engages the front of the side members and the clamping member engages the rear of the side members and in which the clamping member has an arcuate-shaped outer portion engaging the rear of the spaced side members.

4. A structure defined in claim 3 in which the inner end of the clamping member has an inturned end to engage the strip.

References Cited

UNITED STATES PATENTS

| 3,099,400 | 7/1963 | Holmes | 240—7.55 |
| 315,433 | 4/1885 | Mower | 240—78 XR |
| 1,275,758 | 8/1918 | Rosenbluth | 240—8.3 |
| 2,710,336 | 6/1955 | Jorn | 240—9 |

FOREIGN PATENTS 461,182  11/1949  Canada.

NORTON ANSHER, Primary Examiner

D. S. STALLARD, Assistant Examiner

U.S. Cl. X.R.

240—8.3, 58